United States Patent [19]
Thompson

[11] Patent Number: 4,672,769
[45] Date of Patent: Jun. 16, 1987

[54] ADJUSTABLE FISHING FLOAT

[76] Inventor: Fayette Thompson, 10728 NE. Halsey, No. A-2, Portland, Oreg. 97220

[21] Appl. No.: 889,752

[22] Filed: Jul. 28, 1986

[51] Int. Cl.$^4$ ............................................. A01K 93/00
[52] U.S. Cl. .................................................. 43/43.11
[58] Field of Search .................. 43/43.1, 44.88, 44.87, 43/43.11

[56] References Cited

U.S. PATENT DOCUMENTS

| | | | |
|---|---|---|---|
| 1,973,028 | 9/1934 | Thomas | 43/43.11 |
| 2,902,792 | 9/1959 | Friday | 43/44.87 |
| 3,087,275 | 4/1963 | Svoboda | 43/44.87 |
| 3,196,575 | 7/1965 | Kotis | 43/44.87 |
| 3,303,598 | 2/1967 | Spindler | 43/44.9 |
| 3,375,603 | 4/1968 | Loghry | 43/43.11 |
| 3,443,336 | 5/1969 | Reese | 43/44.88 |
| 3,800,461 | 4/1974 | Jacobi | 43/44.88 |
| 4,477,995 | 10/1984 | Fenn | 43/43.11 |
| 4,571,874 | 2/1986 | Smaw | 43/44.91 |

Primary Examiner—Gene P. Crosby
Attorney, Agent, or Firm—Klarquist, Sparkman, Campbell, Leigh & Whinston

[57] ABSTRACT

A fishing float for attachment to a fishing line comprises a buoyant member and a pulley mounted to the buoyant member, the pulley freely rotatable about its normal axis. A rotatable cover having a pair of opposing arcuate slots encloses the pulley to guide the fishing line onto and off the pulley, enabling the line to move freely through the float.

6 Claims, 5 Drawing Figures

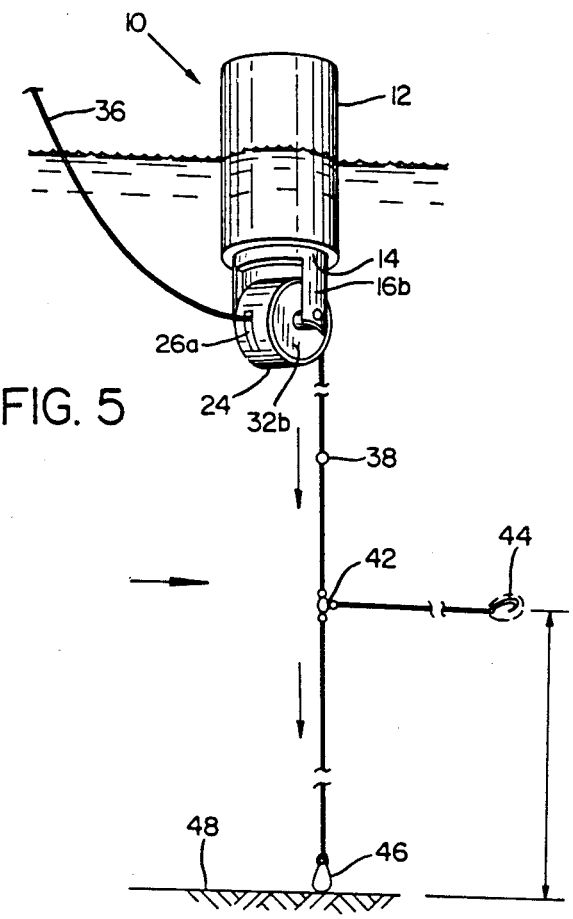
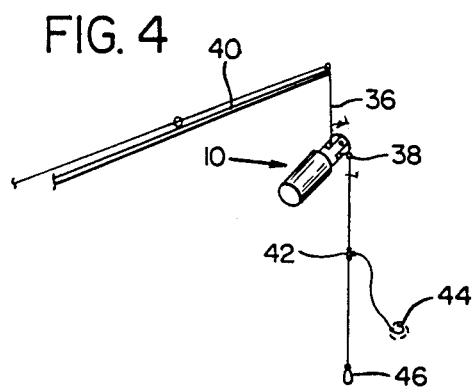
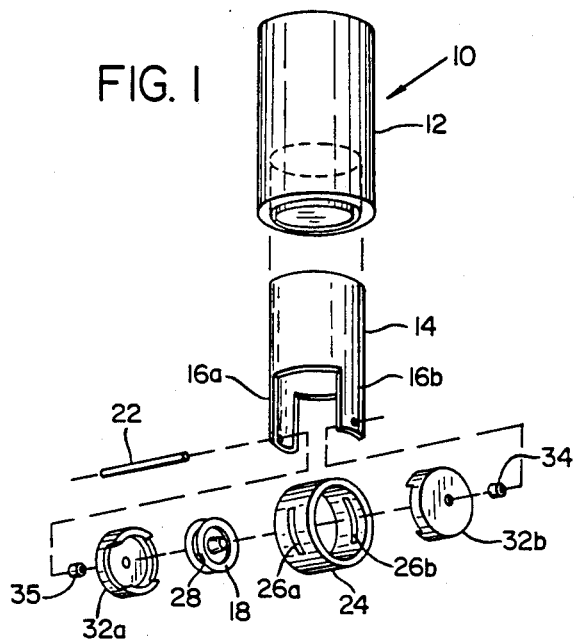
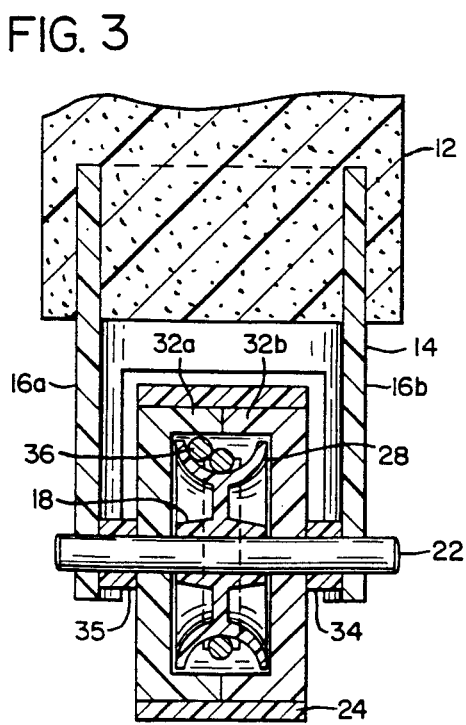
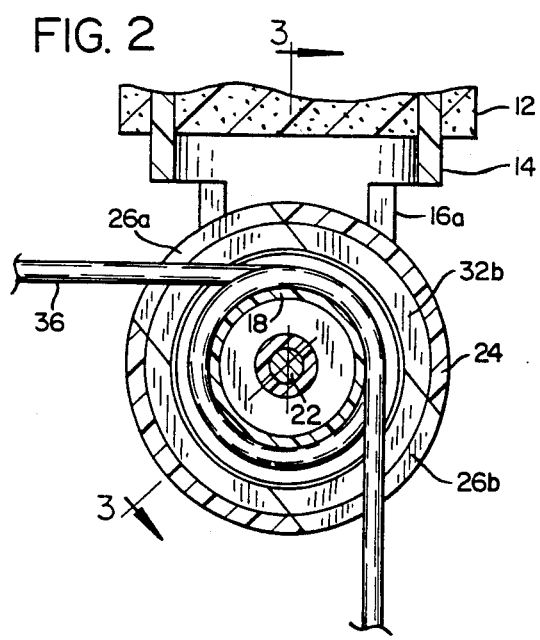

ADJUSTABLE FISHING FLOAT

BACKGROUND OF THE INVENTION

This invention relates to fishing floats and more particularly to a fishing float through which fishing line can be passed freely when the float is afloat in water.

Fishing floats find widespread use in several kinds of fishing, including bottom, lure, and jetty fishing. In bottom fishing, for example, the baited hook ideally floats just off the bottom of the body of water, where it can be reached by bottom feeders such as catfish, sturgeon, and carp. The baited hook is attached toward the casting end of the fishing line just up from a sinker at the line's end. Beyond the hook, a fishing float is set on the line at the approximate depth of the body of water. The fishing float suspends the portion of the line between the fishing rod and the float near the surface of the water, thereby preventing the line from lying along the bottom where it can become entangled in weeds or rocks. The float also keeps the baited hook off the bottom to enable bottom-feeding fish to detect the bait and bite the hook.

In lure fishing, a fishing float serves a further purpose beyond keeping the line free of bottom entanglements. The fishing lure is attached to the end of the line to be suspended by the float at a desired depth in the water. The float, while suspending the line, should allow a fisherman to jig or bob the line and lure to attract fish.

In jetty fishing, the bait must be suspended directly from above, or the hook and line are likely to become entangled in the boulders comprising the jetty. The fishing float attached to the line enables the line to drop straight downward from the water's surface into openings between the boulders where fish are likely to lurk.

For these kinds of fishing, a float that allows the depth of the line to be adjusted once it is cast is of great value. Often the depth of water is unknown, and the precast setting of the float on the line causes the hook or lure to be too high in the water or to be resting on the bottom. For effective jigging of a line, the lure must be able to move vertically in the water and hence pass through the float on the surface.

The need for adjustable fishing floats has spawned a number of designs. U.S. Pat. No. 2,902,792 to Friday, for example, discloses a spherical float that allows the depth of the line to be set when the float is afloat in water. The depth of the line is adjusted by a sideward pull on the line to move the line into a slit between pairs of adjacent fingers on the sphere.

U.S. Pat. No. 3,800,461 to Jacobi discloses a float that maintains the hook and fishing line at a predetermined position with respect to the bed of the body of water. The Jacobi float employs a floating cap moving along an antenna to detect when the line reaches the bottom. The hook can then be pulled from the bottom through a one-way clamp.

U.S. Pat. No. 3,303,598 to Spindler discloses a slip bobber that can slide along the fishing line. The depth of the fishing line, however, is controlled by a knot set on the line, allowing the line to be set at only one depth.

U.S. Pat. No. 3,443,336 to Reese also discloses a float that allows the depth of the line to be adjusted without removing the float from water. The float includes a break that can be set by removing tension from the line and released by applying tension to the line. With the tension removed, the line can slide relative to the float to vary its depth in water.

Other patents of interest include U.S. Pat. Nos. 3,196,575 to Kotis, 3,087,275 to Svodba, and 4,571,874 to Smaw.

Despite the advantages each of these floats has to offer, they suffer from two primary drawbacks. For one, none of them offers a simple mechanism for allowing the fishing line to pass freely through the float by merely pulling in or releasing the line. For another, bobbing or jigging the line and lure is difficult with these floats because of the complicated maneuvering required to free the line.

Ideally, an adjustable fishing float should allow the line to pass freely through it until the line reaches the bottom or is stopped at a desired depth by the fisherman. The float should also be stationary in the water and not "walk" toward the rod as the line is cast or retrieved.

SUMMARY OF THE INVENTION

An object of the invention, therefore, is to provide an improved adjustable fishing float of simple design.

A second object of the invention is to provide for a fishing float that allows for easy bobbing of the fishing line.

A third object of the invention is to provide a fishing float that is stationary in the water and through which the line can be freely passed as the line is cast or retrieved by the fisherman.

To achieve these objects, a fishing float according to the invention comprises a buoyant member and a pulley mounted to the buoyant member, the pulley freely rotatable about its normal axis. A guide means is mounted to the member for guiding the fishing line onto and off the pulley. The pulley, with the fishing line wrapped around it, allows the float to remain substantially stationary in the water as the fishing line is passed freely through the float. The depth of the line can thus be adjusted with the float in water without causing the float to "walk" toward the line. Because the line passes freely through the float, it can be jigged or bobbed without complicated maneuvering by the fisherman.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is an exploded view of a fishing float according to the invention.

FIG. 2 is a cross-sectional view of the fishing float of FIG. 1.

FIG. 3 is a cross-sectional view of the fishing float of FIG. 1 taken along lines 3—3 of FIG. 2.

FIG. 4 is a pictorial view of the fishing float of FIG. 1 shown ready to be cast with the fishing line.

FIG. 5 is a pictorial view of the fishing float of FIG. 1 showing it afloat in water.

DETAILED DESCRIPTION

Referring to FIG. 1, an exploded view of a fishing float 10 according to the invention is shown. The float 10 includes a buoyant member comprising a cylindrical buoyant body 12 composed of a molded foam and a hollow cylindrical stem 14 set within the body. The stem 14 includes a main portion surrounded by the molded foam of the body 12 and a pair of parallel arms 16a and 16b extending longitudinally from the main portion of the stem beyond the molded foam. A pulley 18 is mounted between the stem arms 16a and 16b on an axle 22 for rotation in a plane parallel to the arms. The pulley 18 is freely rotatable about its normal axis, defined by the axle 22 that extends through the stem arms for support.

The pulley 18 is housed in an assembly for guiding fishing line through the pulley. The assembly includes a rotatable cylindrical cover 24 that defines a pair of opposing arcuate slots 26a and 26b, aligned with the grooved rim 28 of the pulley for guiding fishing line onto and off the pulley. A pair of cowlings 32a and 32b for centering the pulley 18 within the cover 24 are inserted within the cover on opposite sides of the pulley. On one side of the pulley, a spacer 34 is mounted on axle 22 between cowling 32b and arm 16b to space the cowling and pulley from the arm. On the opposite side of the pulley, a set screw 35 is mounted on axle 22 between the cowling 32a and the arm 16a to space the cowling and pulley from the arm and to hold the axle in place.

FIG. 2 is a cross-sectional view of the pulley 18 and cover 24 taken along the slots 26a and 26b. A monofilament fishing line 36 is shown as it is to be wound onto the pulley 18. The line is wound at least one and a half times around the pulley, winding onto the pulley through slot 26a and off the pulley through slot 26b. The overlapping winding creates sufficient friction between the pulley 18 and the line 36 to prevent the float from "walking" up the line as downward tension is applied to the pulley 18 by a sinker on the end of the line. The float thus tends to remain stationary in the water where it originally lands from a cast.

The slots 26a and 26b are sized and positioned in the cover 24 to prevent the line 36 from binding on the cover 24 as the fisherman attempts to reel in a fish. The opposing tensions of a fighting fish and a taut line may cause the line 36 to be pulled in a number of directions. If the line is pressed against the edge of a slot 26a or 26b, the cover 24 will rotate to relieve pressure on the line and enable it to continue to move freely around the pulley 18.

FIG. 3 is a second cross-sectional view of the pulley 18 and guide assembly. The grooved rim 28 is spaced a distance of less than the diameter of the line 36 from the cowlings 32a and 32b. The line therefore cannot slip out of the rim 28 to interfere with the pulley's operation.

The mounting of the float 10 to a fishing line 36 is shown in FIG. 4. The float is attached to the line 36 by feeding the end of the line in through a slot 26a or 26b, around the pulley 18 as described, and out through the opposite slot. A retaining bead 38 greater in diameter than the width of the slots 26a and 26b is attached to the line to retain the float on the line as the line and float are cast by a fishing rod 40. Below the bead 38, a conventional swivel 42 is attached to the line for connecting a hook 44, a sinker 46, or possibly a lure (not shown).

After the float and line are cast, the sinker 46 draws the float 10 underwater, the pulley 18 frictionally engaging the line sufficiently to prevent the float from "walking" toward the rod 40 as the line rapidly sinks. Once the line stops sinking, the pulley turns freely to raise the float to the water's surface. As shown in FIG. 5, the float rises until a portion of the body 12 is visible, with the pulley submerged beneath the body 12 and oriented to rotate in a vertical plane. If the sinker 46 reaches the bottom 48 of the body of water, slack may develop in the fishing line 36, which is then pulled in. The opposing tensions of a taut line from the rod 40 and a weighted line prevent the pulley 18 from turning and the float 10 from moving toward the rod. The tautness of the line also ensures that the line between the rod 40 and the float 10 is suspended near the surface of the water and drops vertically downward beyond the float, thereby avoiding tangling the line in debris on the bottom 48.

The free movement of the line around the pulley 18 enables the line to be jigged or bobbed merely by pulling in or releasing line. The size of foam body 12 of the float creates sufficient resistance in the water that the float remains substantially stationary on the water's surface as the fishing line is passed through the pulley 18. When the fishing line is retrieved, for example, for another cast, the float remains stationary and the fishing line is raised substantially vertically until the bead 38 contacts the cover 24. The fishing line is then retrieved along the surface of the water as the float is pulled in.

The float 10 can pass the fishing line 36 in any direction. The rotation of the cover 24 enables the line to move in the vertical plane, while the rotation of the body 12 in the water enables the line to move in the horizontal plane.

Having illustrated and described the principles of the invention in a preferred embodiment, it should be apparent to those skilled in the art that the invention can be modified in arrangement and detail without departing from such principles.

I claim all modifications coming within the spirit and scope of the following claims.

1. A fishing float for attachment to a fishing line, comprising:
    a buoyant member;
    a pulley mounted to the buoyant member, the pulley freely rotatable about its normal axis; and
    a cowling adjacent said buoyant member and surrounding the pulley for retaining the fishing line on the pulley, the cowling spaced less than the diameter of the line from the pulley rim to prevent the line from slipping laterally off the pulley,
    the float remaining substantially stationary in the water as the fishing line is passed freely through the float.

2. The fishing float of claim 1 in which the pulley is mounted to the buoyant member so that the pulley is submerged when the float is placed in water.

3. The fishing float of claim 1 in which the pulley is mounted to the buoyant member to rotate in a vertical plane when the float is placed in water.

4. A fishing float for attachment to a fishing line, comprising:
    a cylindrical buoyant body;
    a stem mounted within the buoyant body, the stem having a pair of parallel arms extending therefrom;
    a pulley mounted between the stem arms and parallel thereto, the pulley freely rotatable about its normal axis extending perpendicular to the stem arms; and
    a cover for the pulley, the cover defining opposing arcuate slots aligned with the pulley for guiding the fishing line onto and off the pulley.

5. The fishing float of claim 4 in which the cover is rotatable with respect to the pulley to enable a fishing line binding against an edge of a slot to rotate the cover and the slot, thereby removing the binding of the line.

6. The fishing float of claim 4 including a cowling for retaining the fishing line on the pulley, the cowling preventing the line from laterally slipping from the rim of the pulley.

* * * * *